UNITED STATES PATENT OFFICE.

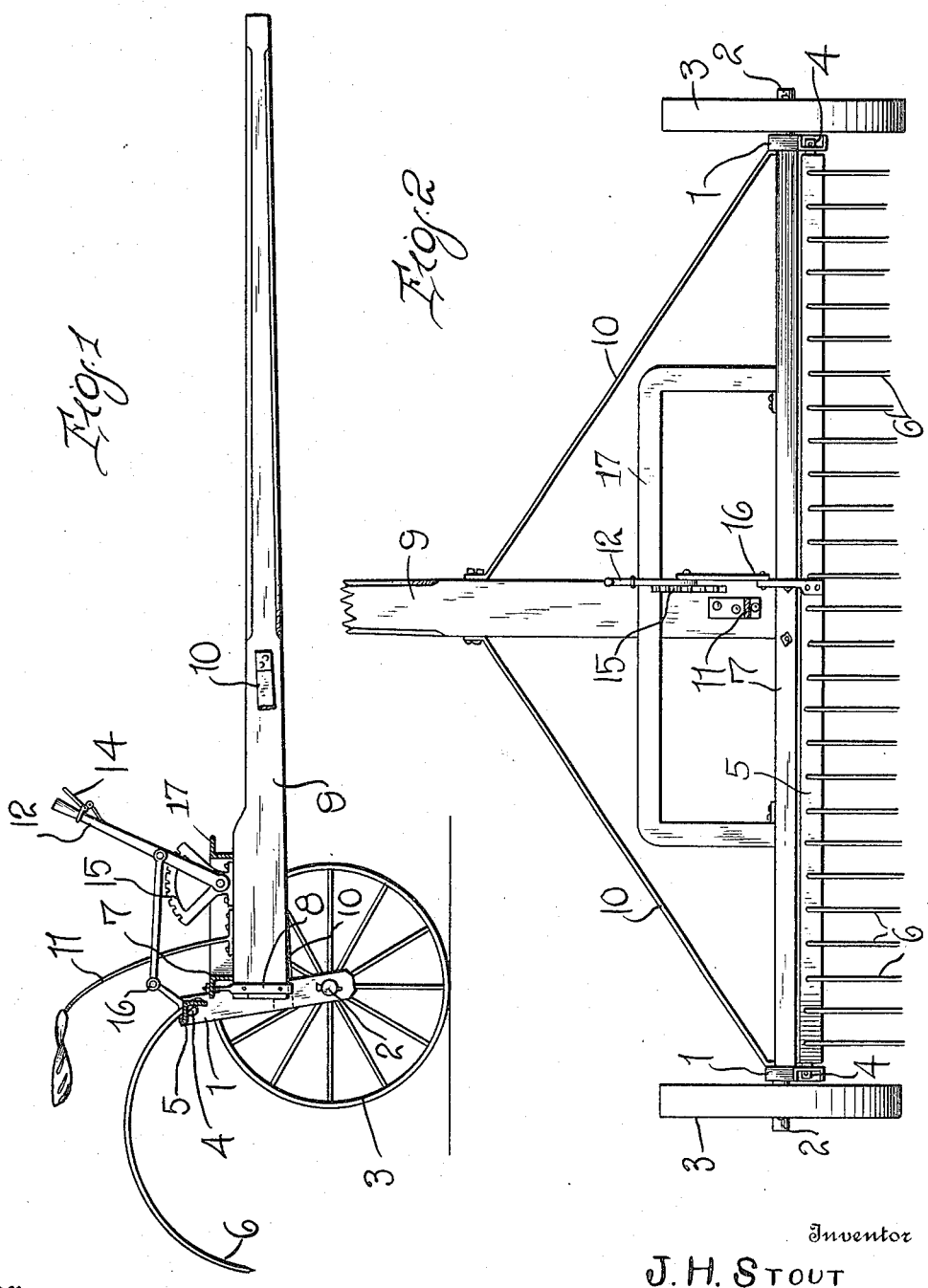

JOHN H. STOUT, OF NORTH YAKIMA, WASHINGTON.

RAKE.

1,170,701.

Specification of Letters Patent.

Patented Feb. 8, 1916.

Application filed September 14, 1914. Serial No. 861,680.

*To all whom it may concern:*

Be it known that I, JOHN H. STOUT, a citizen of the United States, residing at North Yakima, in the county of Yakima and State of Washington, have invented certain new and useful Improvements in Rakes, of which the following is a specification, reference being had to the accompanying drawings.

This invention relates to certain improvements in rakes, and has relation more particularly to a device of this general character of a wheeled type, and the object of the invention is to provide a novel and improved device of this general character which may be employed with convenience and facility in orchards or the like.

It is also an object of my invention to provide a device of this general character including a novel and improved construction whereby the device comprises comparatively few parts and of a minimum weight, yet possessing a maximum of strength.

The invention consists in the details of construction and in the combination and arrangement of the several parts of my improved rake whereby certain important advantages are attained and the device is rendered simpler, less expensive and otherwise more convenient and advantageous for use, all as will be hereinafter more fully set forth.

The novel features of the invention will be carefully defined in the appended claim.

In order that my invention may be the better understood, I will now proceed to describe the same with reference to the accompanying drawings, wherein—

Figure 1 is a longitudinal sectional view taken through a rake constructed in accordance with an embodiment of my invention; and Fig. 2 is a view in top plan of the machine as disclosed in Fig. 1, with the seat structure shown in section.

As disclosed in the accompanying drawings, 1—1 denote substantially vertical upright beams having directed through the lower extremities thereof the stub shafts 2 disposed laterally relative thereto and on which are suitably affixed the supporting wheels 3 of a comparatively small diameter in order that the same may be employed with convenience and facility for collecting hay or the like which is grown in the orchards, as is a general custom in the northwestern part of the United States.

The upper extremities of the beams 1 have journaled therein, the trunnions 4 of the rake frame 5, from which frame extend the conventional prongs 6, said frame 5 being capable of rotary adjustment in a manner which will hereinafter be more particularly referred to. The beams 1 are also tied or connected at a point below the rake frame 5 by the beam 7, from the intermediate portion of which depends a yoke 8 adapted to receive the rear extremity of the draft pole 9 extending forwardly of the machine and to further brace or support the draft pole 9, I find it of advantage to employ the side brace beams 10 secured at one extremity to the vertical beams 1 and at their opposite extremities to the sides of the draft pole, as is clearly shown in the accompanying drawings.

The draft pole 9 in advance of the yoke 8 has secured thereto the seat structure 11, while said cross beam 7 at opposite sides of the pole 9 has operatively engaged therewith the substantially U-shape member 17 which overlies the draft pole 9 and rests thereon whereby the device is materially strengthened. Pivotally engaged with the pole 9 is the lever 12 provided with a latch mechanism 14 coacting with a rack 15 also carried by the pole 9 and said lever 12 is operatively engaged, as indicated at 16, with the rake frame 5 so that the same may be axially rotated in order to adjust the prong 6 into dumping position.

As herein disclosed, the operative connection between the rake frame 5 and lever 12 comprises a rock arm carried by the rake frame with which a rod is pivotally engaged, said rod being also engaged with the lever 12 as is believed to be clearly shown in the accompanying drawings.

From the foregoing description, it is thought to be obvious that a rake constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice.

I claim:

A device of the character described comprising two substantially vertically disposed beams, a tie beam connecting the same, a rake frame pivotally supported between the vertical beams and provided with prongs, a yoke depending from the tie beam, a draft pole having one extremity disposed through the yoke, a substantially U-shape member secured to the tie beam at opposite sides of the draft pole and overlying said draft pole and in contact therewith, brace beams connecting the draft pole and the vertical beams, a seat structure carried by the draft pole in advance of the yoke, a lever pivotally supported by the draft pole, coacting locking means for the lever carried by the lever and the draft pole, a rock arm carried by the rake frame, and an operative connection between the rock arm and the lever.

In testimony whereof I hereunto affix my signature in the presence of two witnesses.

JOHN H. STOUT.

Witnesses:
G. W. BORFUTON,
W. W. DE VEAUX.

Copies of this patent may be obtained for five cents each, by addressing the "Commissioner of Patents, Washington, D. C."